Jan. 7, 1964 — F. G. LAMB ETAL — 3,116,772
METHOD FOR SLICING VEGETABLES
Original Filed Feb. 24, 1961 — 9 Sheets-Sheet 1
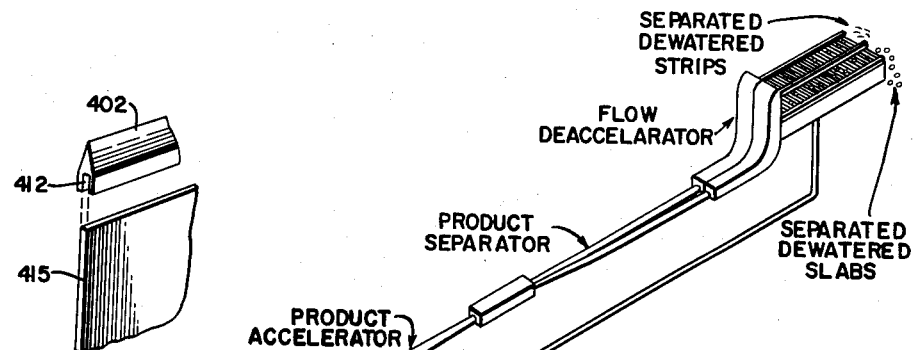
FIG. 19.
FIG. 1.
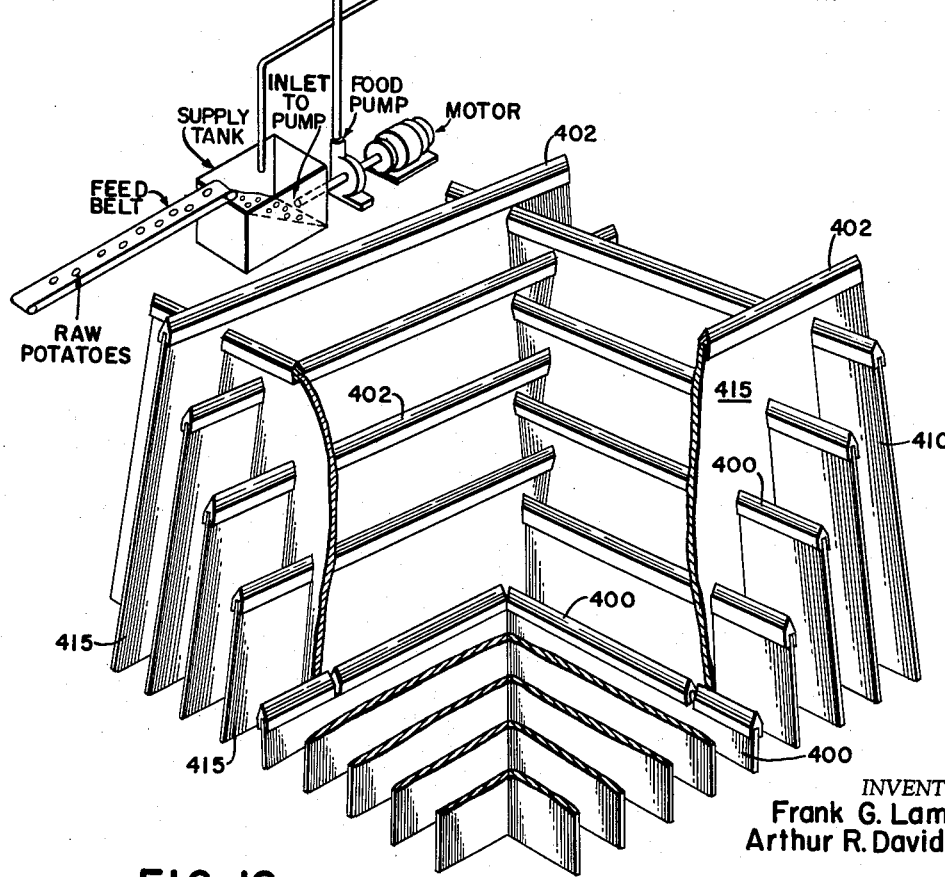
FIG. 18.
INVENTORS
Frank G. Lamb &
Arthur R. Davidson
BY Thomas, Weisman & Russell
ATTORNEYS

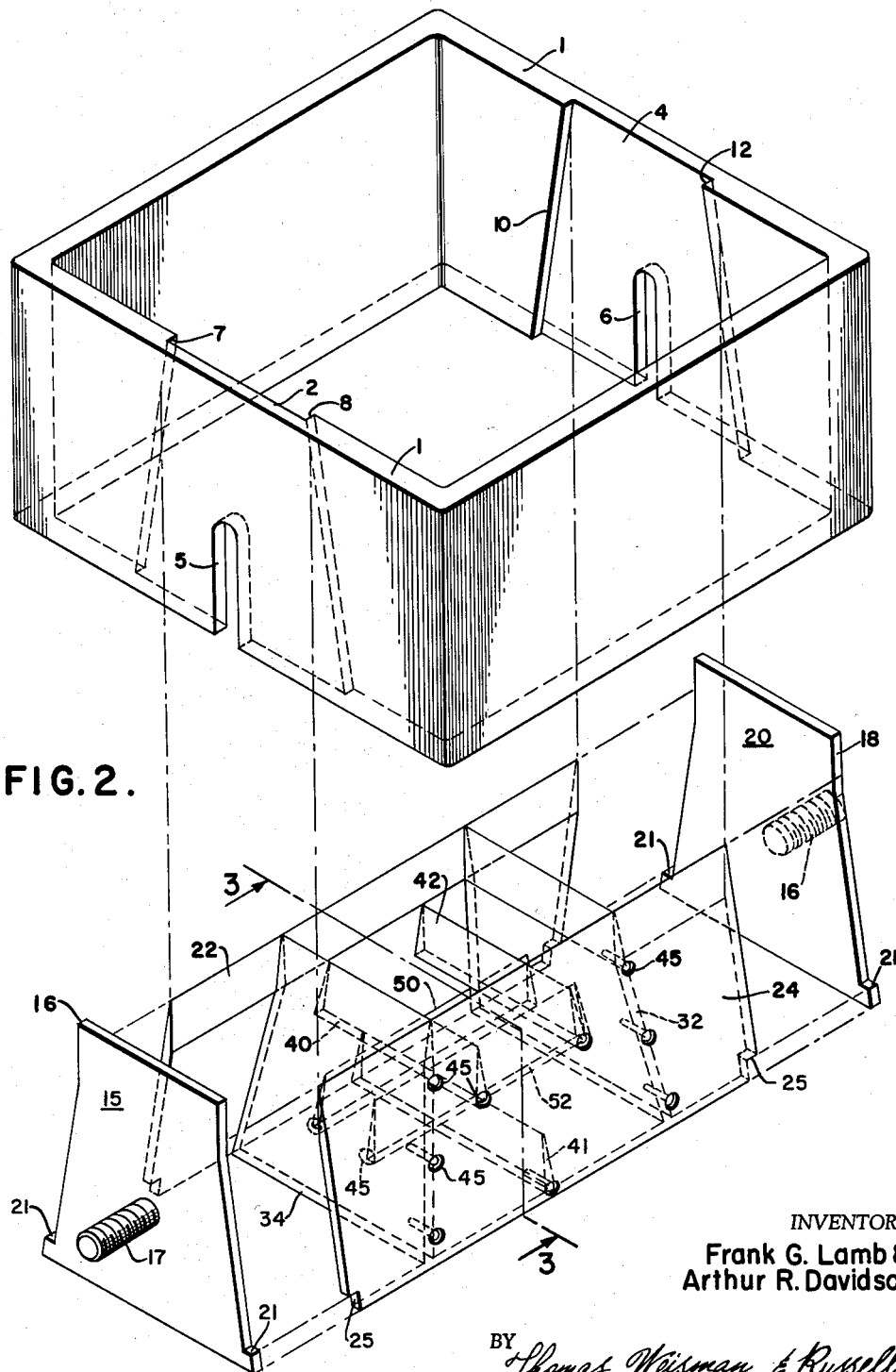

Jan. 7, 1964 F. G. LAMB ETAL 3,116,772
METHOD FOR SLICING VEGETABLES
Original Filed Feb. 24, 1961 9 Sheets-Sheet 5

INVENTORS
Frank G. Lamb &
Arthur R. Davidson

BY Thomas, Weisman & Russell
ATTORNEYS

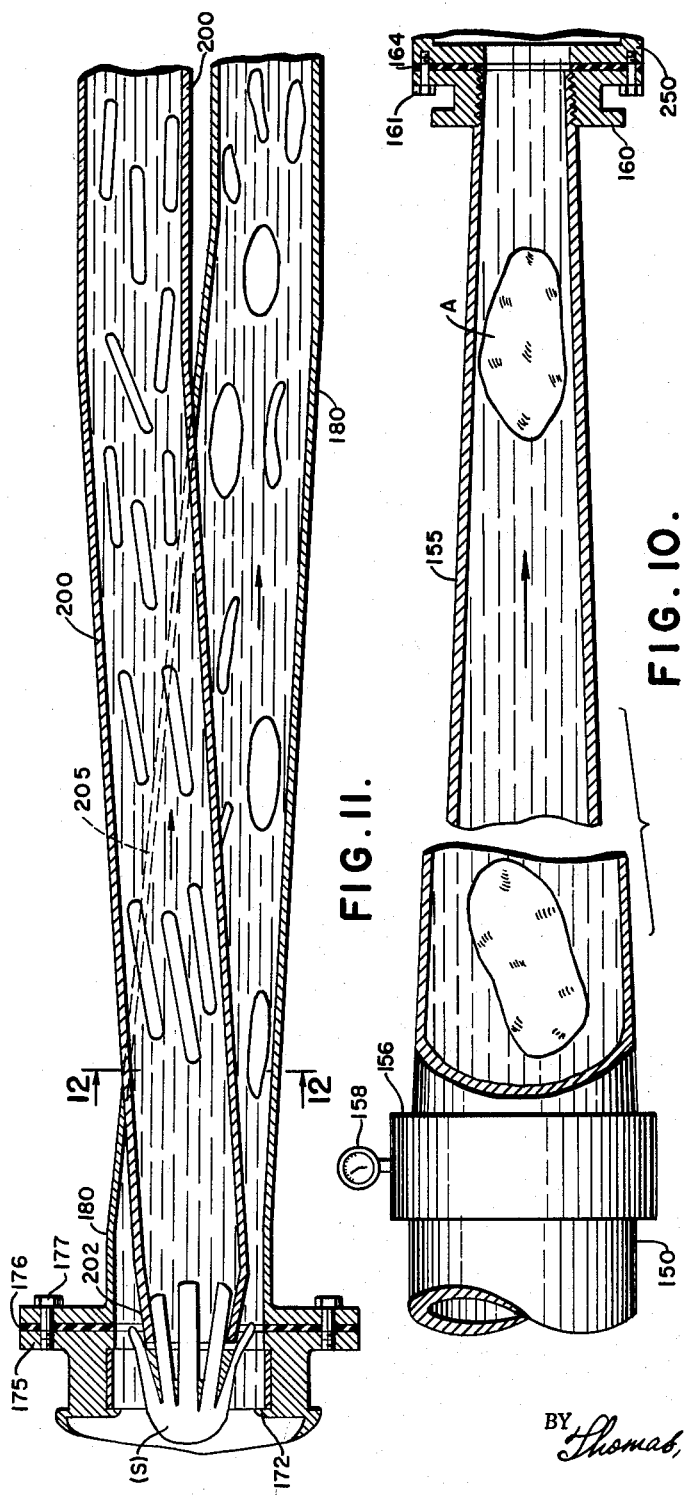

Jan. 7, 1964  F. G. LAMB ETAL  3,116,772
METHOD FOR SLICING VEGETABLES
Original Filed Feb. 24, 1961  9 Sheets-Sheet 8
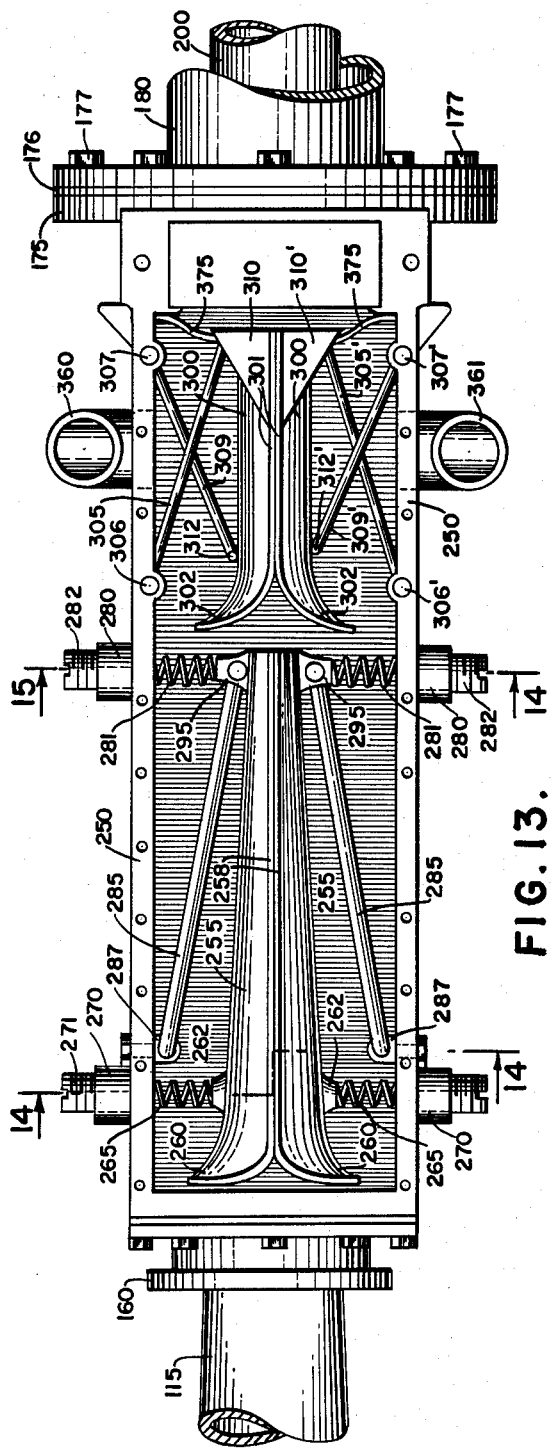
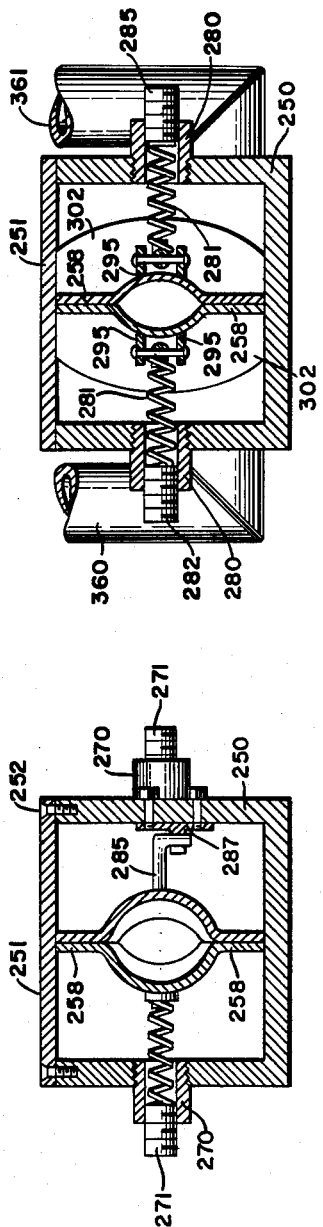
FIG. 13.
FIG. 15.
FIG. 14.
INVENTORS
Frank G. Lamb &
Arthur R. Davidson
BY Thomas, Weisman & Russell
ATTORNEYS Jan. 7, 1964   F. G. LAMB ETAL   3,116,772
METHOD FOR SLICING VEGETABLES
Original Filed Feb. 24, 1961   9 Sheets-Sheet 9
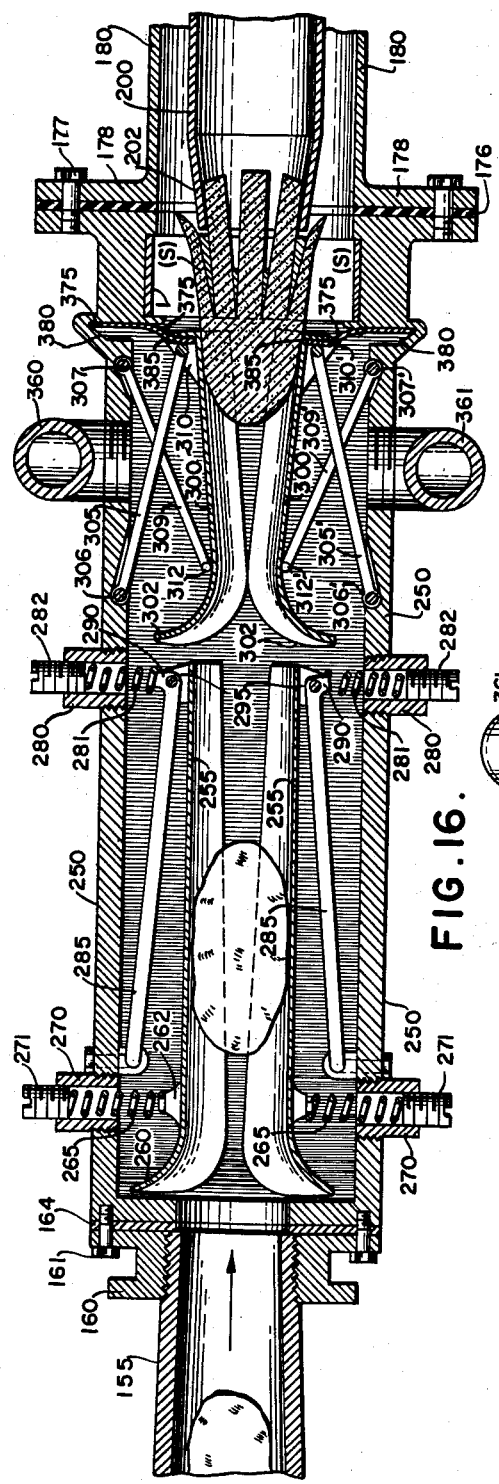
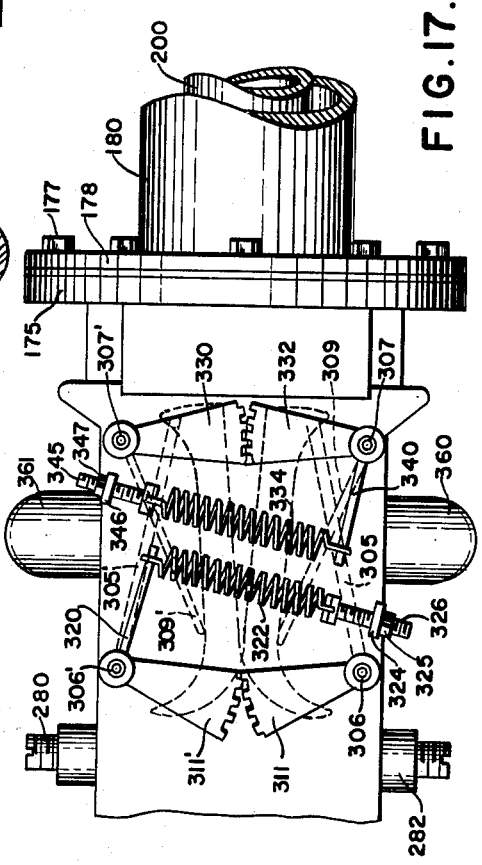
INVENTORS
Frank G. Lamb &
Arthur R. Davidson
BY Thomas, Weisman & Russell
ATTORNEYS

United States Patent Office 3,116,772
Patented Jan. 7, 1964

3,116,772
METHOD FOR SLICING VEGETABLES
Frank Gilbert Lamb, Milton-Freewater, Oreg., and Arthur R. Davidson, American Falls, Idaho, assignors to Lamb-Weston, Inc., Weston, Oreg., a corporation of Oregon
Original application Feb. 24, 1961, Ser. No. 91,444. Divided and this application Nov. 7, 1961, Ser. No. 154,094
4 Claims. (Cl. 146—241)

This invention is directed to an improved method for the slicing of vegetables, and is particularly concerned with the slicing of potatoes for the production of so-called French fried or string potatoes. This application is a division of applicants' copending application Serial No. 91,444 filed February 24, 1961. The invention enables attainment of a maximum yield of long, uniform cross-sectional area cuts. In other words, slicing is performed longitudinally or lengthwise of the potato in a uniform and accurate manner so that the resultant cuts represent the maximum lengths obtainable, limited only by the length size of the type of potato being processed. At the same time, the less desirable outside cuts or portions of the potato, herein referred to as the "slab" portions, are sliced from the sides and removed from the subject center cuts. The latter are simultaneously diverted to other uses, such as that aspect of plant processing involving dehydration of these less desirable portions for preparation as dehydrated mashed potatoes. The invention permits of mass production involving relatively huge amounts of potatoes processed, since the operation is performed hydraulically at extreme speed, with the more desirable center cuts being efficiently sliced in uniform fashion and with minimum or complete lack of damage to the cellular structure of the potato.

There are of course known methods, commercially used, for the slicing or cutting of potatoes. Generally, these methods involve motor-driven circular slicers which cut a potato more or less at random, first in one plane and then in another plane. The end result of such an operation is an almost infinite number of sizes and shapes, here particularly speaking of the French fried variety of potato cut. In other words, it is usual for purchasers to find in a given package of frenched potatoes sold upon the open market, that the lengths of the cuts do not represent the length of the potato but vary considerably; that portions of the sides or slabs of the potato are included in a given serving; and that defective portions such as eyes, unremoved skin, etc., are likewise intermingled with the minor proportion, in such cases, of the desirable center cut pieces. The handling in this manner in the past of this type of food product results from a desire to obtain maximum yield and also from the vast variety of shapes of the raw product involved—potatoes. Yet the desired objective in such respect is not obtained by these previous methods.

In some restaurants and even in some homes, the so-called French fries are cut by forcing them through a wire-like rectangular grid. Such grids are of various versions. Some have blades substituted for the more common wire construction. However, even when blades are utilized, the same are located in parallel relationship and with all cutting edges in the same plane. These structures exhibit certain additional disadvantages—they are not sufficiently strong to be used in a process, as it is here visualized, where the potatoes are rapidly sliced at a high rate of speed. Devices such as these, if attempted to be used upon a mass production basis, will not retain the cutting edge and damage to the cellular structure of the potato results.

The instant invention overcomes these and other many difficulties. The invention, as stated, enables not only extremely rapid and efficient cutting into strips or slices of predetermined size, but eliminates from the final product those portions of the potato which from a purity and taste standpoint should in any event be eliminated: the skin, some of which remains after even the most efficient of previous methods are used for mass peeling of potatoes; the eyes, and as well, other ordinary imperfections common to the tuber.

It is accordingly a primary objective of this invention to provide a means, and a method of operation of same, which achieves a uniform and even slicing of vegetable products, particularly the potato, thus obtaining as one example, Frenched potatoes from the center of the tuber which represent the true over-all length thereof, and which are of standard dimension and uniform in cross-sectional size. All of this is achieved without cellular damage to the product (a comparatively important factor) and with a rate of speed that permits of economical, daily output measured in terms of considerable tonnage.

Another object of the invention is the provision of a device which will permit removal of the four exterior sizable slabs from the potato, leaving only long rectangular interior sections which are simultaneously cut from the center and primarily used for frenched potatoes. In this respect, the slabs or side pieces can be diverted to other processing steps such as dehydration procedures used in the preparation of dehydrated mashed potatoes. The center portion, the extremely desirable cut from the potato, is forced through a series of cutting knives. These are arranged at right angles to each other and in different cutting planes. Formed with definite angular edges and inclinations they permit efficient and rapid cutting without smashing or distortion of the potato and resultant cellular damage thereto. One embodiment of the invention contemplates that the knives in each instance are triangularly formed at their cutting edges with an angle from about 7° to about 10°. In each case these blades are positioned in critical fashion: the side of the blade toward the center in each instance is parallel to the center line of the cutting device or coaxial with the direction of the cut. Such an arrangement renders possible the simultaneous separation of the slabs from the evenly formed cross section to be French fried. In operation, there is a complete absence of so-called slivers and short and non-uniform lengths. Observation of the cut product demonstrates complete lack of damage to each of the desirable and longitudinal center cut sections.

Another object of the invention is to provide a method for continuously and rapidly forcing a great number of potatoes through the slicer at a high rate of speed and with sufficient force to render the slicing a split-second operation. In the present instance, the product is carried hydraulically through an appropriate conduit to the point of admission to the cutter device; the velocity and pressure of the fluid carrying the separated potatoes are such as to cause impingement upon the referred to cutter blades with great effective rapidity.

The mechanism, as will be described hereinafter, is so constructed and its mode of operation so controlled that individual potatoes are separated from each other the required distance before hitting the cutter head, and are exactly located longitudinally (not crosswise) with respect to the line of flow of the carrying fluid. They are thus positioned to secure the longest cut possible—from end to end or longitudinally of the potato. Novel spring-loaded shoes or guides facilitate an operation which assures this proper feed-in of the product to the cutter device.

In line with the foregoing objective, a means is provided for positively and adequately spacing adjacent potatoes in the fluid conduit so that jam-up is impossible. This means, inter alia, takes the form of a gradually decreasing diameter in the hydraulic line as it approaches the cutter element. The consequent increased pressure, much similar to a venturi effect as will be well understood, results in sufficient increase in velocity of that potato reaching this section of the conduit first to appreciably separate it from a following potato.

Another objective of the invention is the provision of a cutter device for use with this novel type of hydraulic feed wherein the cutting knives take the form of blades which may be removably mounted upon a series of separate blade supporting elements. The latter are permanently secured together and so devised that such separable blades can be readily positioned in place or withdrawn from the honeycomb structure of the cutter element for sharpening purposes.

A further essential objective of the invention is the provision of a device of the nature briefly referred to in the foregoing which entirely eliminates the need of any manual operation or intervention and which, as stated, performs this feeding, alignment, cutting, separating and discharging sequence with extreme rapidity and efficiency.

Other objectives and advantages of the invention will be appreciated from the more detailed description of the invention which follows, made with reference to the various explanatory drawings accompanying this specification wherein:

FIGURE 1 is a diagrammatic perspective view of the several fundamental and related elements of the invention, particularly showing the continuous nature thereof in receiving, cutting, separating and discharging the evenly sized, center cut slices on the one hand and the less desirable exterior slab portions on the other;

FIGURE 2 is an exploded projection view of a preferred form of cutter element illustrating the manner of positioning and of removal of the several involved cutting blades;

FIGURE 7 is an enlarged section view of one of the outside slab knife elements as shown in FIGURE 4 indicating the degree of angularity thereof and demonstrating also its positioning with the inside surface of the blade parallel to the line of travel of the potato;

FIGURE 10 is a section view through the accelerating section of tapered conduit ahead of the cutter assembly showing the manner by which such taper induces acceleration of the lead potato, thus appreciably separating it from the following potato;

FIGURE 11 is a section view of the preferred forms of discharge conduits or flumes which separate the slab portions from the center cut portions and convey such separated portions of the product to the dewatering device;

FIGURE 12 is a section view taken on the line 12—12 of FIGURE 11;

FIGURE 13 is a plan view of a preferred form of cutter assembly box with the top cover thereof removed to particularly illustrate the spring controls for the two pairs of guides or shoes and relative positioning of the latter with respect to each other and to the cutter device;

FIGURE 14 is a section view taken on the line 14—14 of FIGURE 13;

FIGURE 15 is a section view taken on the line 15—15 of FIGURE 13;

Figure 3:
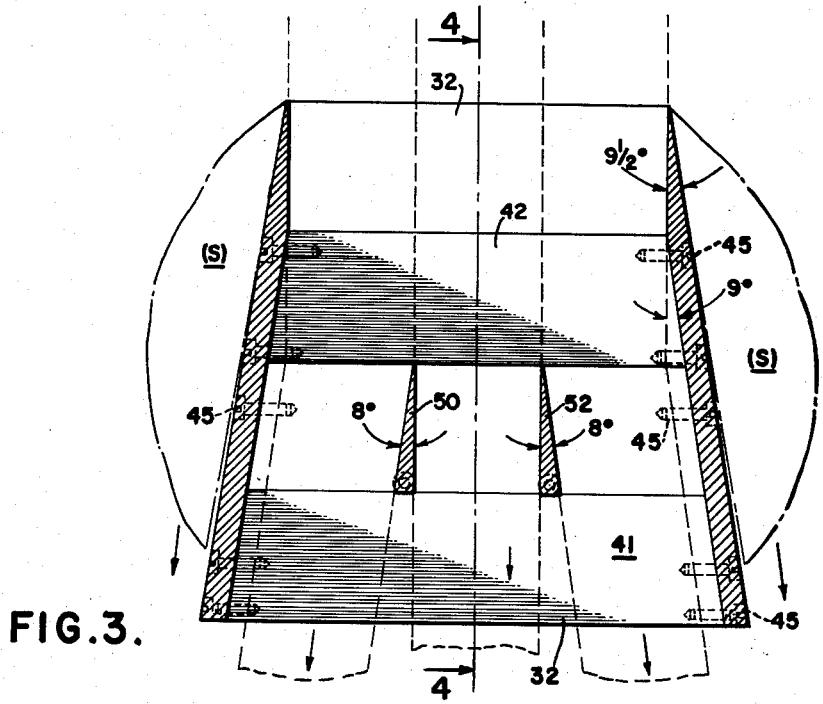
FIGURE 3 is a section view taken on the line 3—3 of FIGURE 2.

FIGURE 16 is a cross-section view of the invention as it is shown in FIGURE 13 demonstrating the manner in which two of a series of potatoes, by the means aforementioned, are sufficiently separated so that they individually progress through the cutter means, this figure also illustrating the manner by which the positioning shoes or guides are evenly deflected or opened during the progress of the product therebetween;

FIGURE 17 is a view of the bottom of the feeder-positioner and cutter assembly illustrating the interlocking gear and spring means assuring that opposed guides within the positioner are confined to inward or outward movement of an equal amount, thus enabling exact and controlled center positioning of the potato during the cutting operation;

FIGURE 18 is a perspective view of an alternate or variant form of cutter element showing the manner in which removable blades may be supported on a multiple series of crossed supports for the same; and FIGURE 19 is an enlarged perspective view of one of the removable blades shown in FIGURE 18 and demonstrating its manner of positioning on one of the blade supporting members.

The general arrangement of the component and essential elements of the invention is graphically depicted in FIGURE 1. Here it is seen that the raw potatoes, previously scraped or steam peeled by known methods, are fed to an appropriately mounted feed belt, the latter discharging into the supply tank. The supply tank has an inclined false bottom, as shown, so that the product rolls downwardly within the tank toward the inlet line located at the opposite side and near the bottom thereof. The tank is of course kept filled with water (or other fluid medium) to a predetermined point, the water being constantly recycled for continuous use.

A food pump, driven by a suitable motor, is utilized to carry the product hydraulically through the feed line. Such pump is of a well known, open vane type and designed specifically, as its name indicates, for the transportation of various types of food products. The feed line terminates in a feed accelerator tube, the essential feature of which consists in merely a gradual narrowing or constriction of the feed line. This gradual reduction in diameter induces, due to resultant greater pressure, increased velocity in the flow of water through the line at that point. As each potato reaches this point in the line, it is thus caused to be accelerated or spurt forward and consequently becomes appreciably spaced from the immediately following potato just prior to feed-in to the cutter. In other words, the potatoes are fed into the food pump in a reasonably even flow but cannot always be perfectly lined out or separated one from the other. Therefore, as they flow down the pipe line and approach the cutter, they can be somewhat jumbled together. Hence, in order to obtain complete separation, flow velocity is increased by reducing the pipe line gradually through an appreciable distance (in the preferred embodiment of this invention about 8 to 10 feet). This speed up of flow accelerates the lead potato and tends to string the potatoes out so that they enter the feeder-positioner and hence the cutter, one at a time, and are not pushing one upon the other.

Each potato in the line is thus forced individually and with considerable speed and pressure against the cutter assembly. In this embodiment of the invention, the pump is designed to handle quantities of water from about 200 to 1,000 gallons per minute, the velocity of the water under such conditions reaching speeds of from about 2 to 5 feet per second. Since the potatoes are carried along with the water they attain velocities of or near to that of the water. The considerable pressure which is applied to cause this flow of water acts to force the potato through the cutter assembly and the feeder-positioners or shields forming a part thereof. However, the main force that propels the potato through both feeder-positioners and cutter element is that force latent in the potato due to its weight and velocity the moment of entry into the positioning devices.

Upon entry into the cutter assembly, each potato is centered along the center line axis of such cutter assembly, this being accomplished partly through the wall of water surrounding the product but primarily by means of the shoe or shoes which act to so centrally position the product. Furthermore, the greatest width of the potato is also disposed vertically with respect to the unit. These centering devices, oval in configuration, will be described in more detail hereinafter.

Upon leaving the positioning devices, the potato, at relatively great speed, is forced against the sharp knife edges of the cutter, such knives being arranged to slice the center of the potato into a predetermined number of elongated segments representing the substantial length, and center core, of the potato. At the same time, the cutter removes four exterior slabs from each side of the potato.

Following this cutting operation, the slabs and center cuts are separately fed into the product separator lines indicated in FIGURE 1, the slabs separated for further processing and the center cuts or french fry cuts of the potato routed to appropriate cooking and/or freezing procedures.

Each line of the product separator, one carrying the slabs and the other carrying the center cut slices, enters a flow decelerator. This merely consists of a pair of upwardly inclined discharge elbows, one for each type of cut, the vertical positioning of same aiding in decreasing the velocity of the propelling fluid, in order to minimize possible damage to the product.

From these flow decelerators, the potato strips or elongated center cut segments are discharged to a dewatering screen. This comprises any known type of open reel or shaker which would convey the product to the end thereof but permit the water to fall through an appropriate catch can for return to the supply tank.

The slabs of potato, which likewise are discharged through a similar decelerator means, also are caused to fall upon a like dewatering shaker or reel device and are then discharged to an appropriate line for further processing.

The entire asembly thus permits of extremely rapid and efficient handling of large quantities of the raw product, each potato being divided on the one hand into full length center cut strips suitable for french fries, and on the other hand, into the less desirable slab portions which can be utilized, as stated, in the further processing of such products as dehydrated mashed potatoes.

Figure 4:
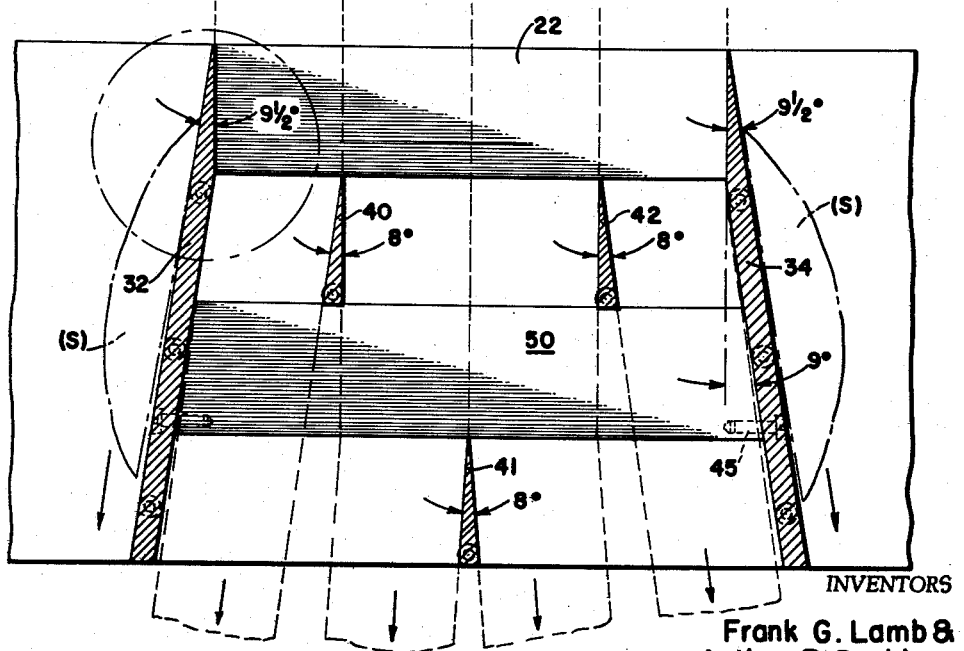
FIGURE 4 is a section view taken on the line 4—4 of FIGURE 3.

One arrangement of cutter blades of the cutter assembly is illustrated in detail in FIGURES 2, 3 and 4. It is seen that these series of crossed blades, devised to dispose of the exterior slabs on the one hand and cut the longitudinal interior length of the potato into equal and square frenched strips on the other, are housed within a cutter housing 1, here shown as being square in configuration. Two opposed sides of this housing are grooved as at 2 and 4, these channels having pyramidal sides such as those indicated upon one end plate at 7 and 8 and upon the other at 10 and 12. The sides of the channels 2 and 4 are angled toward each other at about 9° to the vertical. Upon two of its sides, the housing is provided with two slots 5 and 6 to accommodate appropriate bolts 16 and 17 by which the cutter housing of this modification of the invention can be fixed within the cutter box assembly.

Each of the pyramidal grooves or channels 2 and 4 respectively are in turn adapted to receive two end plates 15 and 20, these end plates directly supporting the two side cutters 22 and 24. It will be seen that the sides of each of these cutter blades 22 and 24 are mounted in between the edges of the plates 15 and 20 and the two pairs of grooves 7, 8 and 10, 12. The upper portion of each plate 15, 20 is disposed to the vertical, as shown at 16 and 18. At each end the lower edge of each cutter blade 22 and 24 is notched as at 25, such notch in each instance being arranged to engage an accommodating ledge or flange 21 formed in each lower corner of each end plate 15 and 20. Hence, with the outer blades 22 and 24 mounted as shown in FIGURE 2, it is seen that the same are retained by the bolts 16 and 17 within the referred to grooves after being positioned upon the two end plates, further support for these two side blades being unnecessary once the positioning of the inner and crossing blades is accomplished.

The two cutter blades 22 and 24 may be considered knives with which to remove the outside portions or slabs (S) of the potato on the two corresponding sides thereof as it is positioned through the cutter mechanism. Corresponding cutter blades for removing the other two slabs (S) of the potato are found in blades 32 and 34. These are mounted right angularly to the exterior blades 22 and 24, and like the latter, are in parallel alignment. They are so spaced from the end plates 15 and 20 as to form a central area defined by blade 22, blade 32, blade 24 and blade 34, this area constituting the center cut section of the potato.

Within this center section are mounted an additional series of blades, so spaced (both laterally and vertically) that the potato is cut or sliced into strips equal in cross-sectional dimension, and representing the length of the potato.

Referring first to FIGURE 3, it is seen that there a pair of intermediate blades 50 and 52 which are positioned parallel to the slab cutting blades 22 and 24 and which are equally spaced from each other and from such side blades. These, like the blades 32 and 34 are, secured to the latter by means of screws 45 as indicated in FIGURES 2 to 4 inclusive.

In addition, there are three blades disposed parallel to knives 32 and 34 and positioned in staggered relationship with each other. These blades or knives 40, 41 and 42 respectively are particularly shown in FIGURE 4 and they likewise are spaced equally from each other and from the slab cutting blades 32 and 34 so as to divide the center cut portion of the potato into equal cross-sectional segments. These latter blades are secured as by the same screw means 45 to the sidewalls represented by the slab cutting blades 32 and 34.

Usually potatoes being processed are of a type of greater cross-sectional area in one direction than the other. This is particularly true with respect to the product for which this particular invention is designed—the Russet-Burbank potato, which is longer than it is wide and thinner in one width section than the other. Having this in mind, it is seen that the blade spacing of FIGURE 3 accommodates the narrower section of such product by having only four evenly spaced blades, whereas the blade arrangement of FIGURE 4 is wider, and hence accommodates the wider section of the potato, the latter blade formation being five in number and staggered as indicated. Means to position the potato with the greater width thereof in the desired direction will be later described.

The staggered mounting of these various blades and their cross-sectional configuration insofar as effective cutting action be concerned, is critical to the invention. For example, there are four slab cutting blades. These are the two blades 22 and 24 which are mounted in the opposed grooves or channels of the cutter casing, as described above, and the two transverse blades 32 and 34 disposed right angularly to the first pair. In each instance, the upper portion of the blade is formed with an edge representing an angle or arc of about 9½° (see FIGURES 3 and 4). The inner cutting side 55 of the blade, as indicated in these figures, is mounted vertically with respect to the longitudinal axis of cutting action, the blade itself being tapered or inclined outwardly in each instance.

Referring to FIGURE 7, it is seen that although the angle of the cutter edge is 9½° as just described the inner surface 57 of the blade (here blade 32) when mounted within the cutter, and here describing the angle with reference to such inner face is positioned at 9° to the vertical, the remaining ½° indicating that spacing between the face of the cut slab and the outside face of the blade. Hence, the slabs are cut with the least possible contact between product and blade, thus substantially reducing frictional resistance and permitting maximum weight and velocity of the product to be exerted against the cutting edge of the blade and the edge only. By reference to FIGURES 3 and 4, it will be seen that this concept has been carried into effect with respect to each of the slab cutting blades.

The other center cut blades are also mounted so that as the potato is sliced or stripped into its component segments, these segments, after the cutting action, do not come into contact with each other but are spread outwardly with respect to each other as shown in these figures. Here again, the outward flare of each cutter permits of such function.

Thus, referring firstly to FIGURE 3, it is seen that the two center cut blades 50 and 52 are provided with an edge of slightly less angularity than the 9½° edge of the slab cutters. Each of these center cut blades have an edge representing an 8° arc or segment. This represents an edge at least 1½° less than the slab cutters or 1° less than angularity to the vertical at which such slab cutters are mounted. It is important to note that both of the center cut blades 50 and 52 are so mounted that the inner faces thereof are parallel to the center axis of the cutter, whereas the angularity of the blade rests upon the side exterior to such vertical line. Thus, after cutting these center cuts, and, as shown in FIGURE 3, such center cuts are thrust to one side and hence substantially spaced from the intermediate or exact center cut. Here again, the function is removal of any further frictional, compressive or squeezing contact of the strips of potato after same has been cut by the involved knife edges. This again results in utilizing all of the force with which the product impinges upon the cutter in cutting action alone and without frictional or compressive action which might either inhibit the cutting action or damage the internal and cellular structure of the potato.

The same comments are in large part true with respect to the blades as shown in FIGURE 4 which are mounted right angularly with respect to the two blades 50 and 52. Here it is seen that the upper blades 40 and 42 are mounted in exactly the same fashion as blades 50 and 52, that is, with the inner faces of each of same in parallel relationship and aligned in parallel fashion with respect to the axis of cutting action. Hence, the 8° angularity of such blades is upon the outer side thereof so that the two side cut portions of the potato are again thrust outwardly.

Again referring to FIGURE 4, the bottommost blade 41, and that blade exerting the last cutting action of the cutter assembly, is mounted differently than blades 40, 42 and 50, 52. Here this last blade 41, at the bottom or outby end of the cutter, is positioned with its center line exactly along the center axis of the cutter action. Having a blade forming an 8° arc or section, it is seen, in this location, as extending 4° upon each side of the center axis so that each of the two segments cut by that blade are again thrust to one side, but in lesser amount. The effect is to preclude further substantial contact or compressive action between such cut strips.

This is true of all of the center slices of the cut potato, for viewing these figures, it is seen that this peculiar and ingenious arrangement of the several involved blades permits of rapid and accurate cutting action yet prevents damaging compressive or jamming contact by separating each of the cut strips from one another after the cutting action has taken place. Such action is graphically illustrated in FIGURES 3 and 4, the several center cuts of the potato shown in dotted line pictured as being substantially separated from each other.

It will be noted that four slabs are cut from each side of the potato by the respective slab cutters 22 and 24 on opposed sides of the cutter assembly, and by slab cutters 32 and 34 on the other opposed sides of the cutter assembly. On the other hand, as to the center cut slices (see FIGURE 6A) it is seen that there are twelve such longitudinal center cuts, segmented by the central blades as above described.

Means are provided for separating these exterior slab portions from the center cut or desirable sections which are taken from the center area of the potato and longitudinally thereof, in order that the two portions of the potato can be directed to different channels for different processing.

Figure 5:
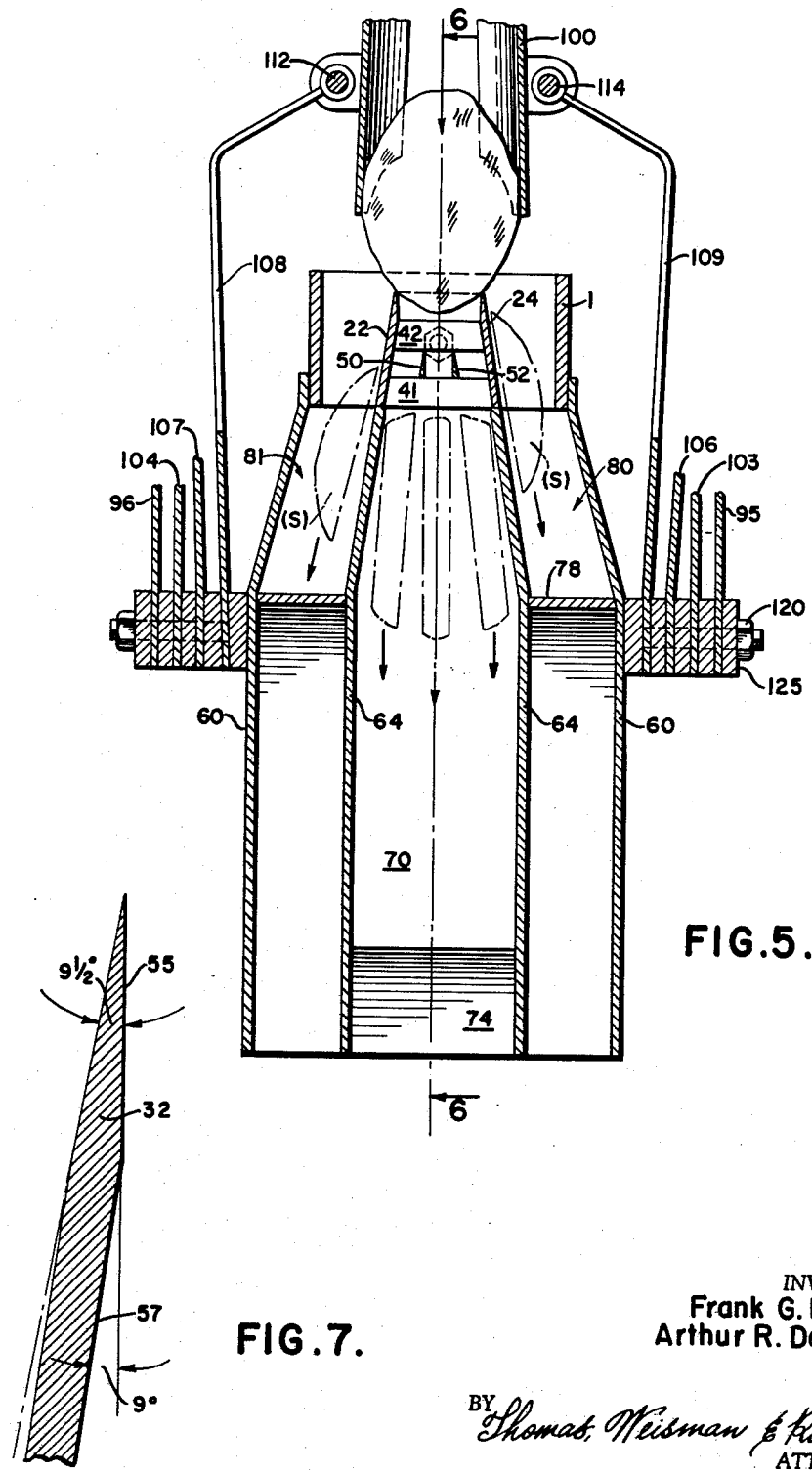
FIGURE 5 is a section view illustrating the manner in which the potato is discharged longitudinally or endwise with respect to its line of travel into the cutting device, and also showing one mode whereby the side sections or slabs are cut away while simultaneously the inner and the desirable core of the potato is precisely cut into predetermined sections of maximum length.
Figure 6:
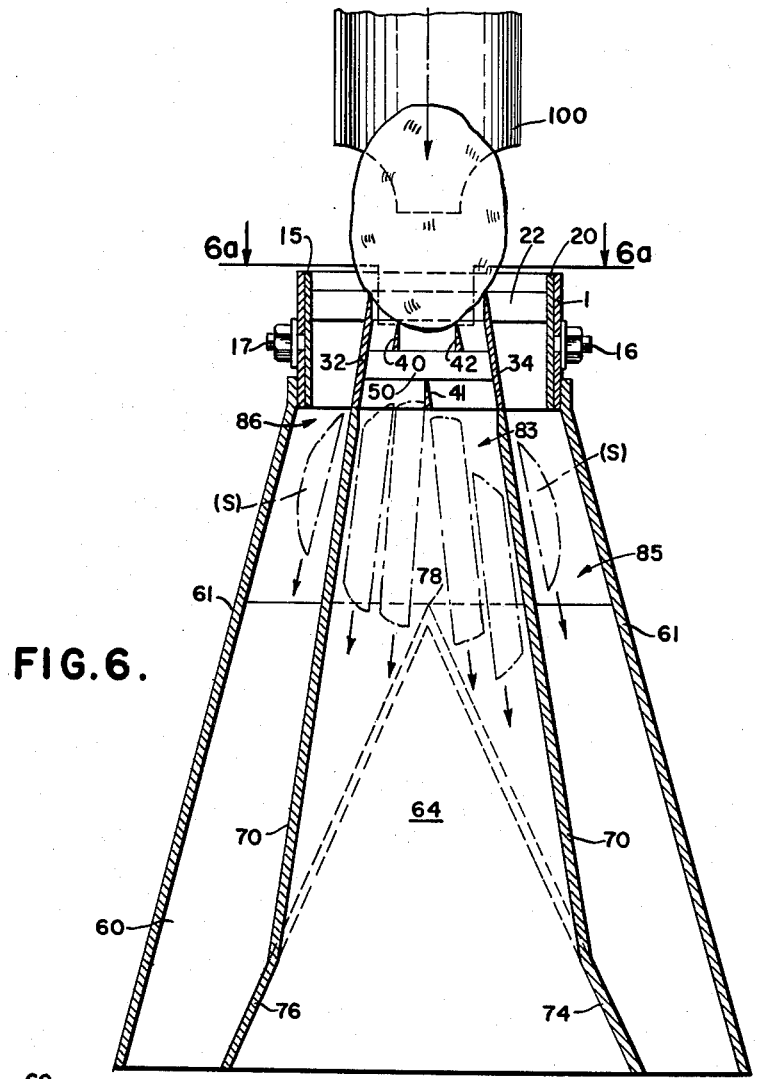
FIGURE 6 is a section view taken on the line 6—6 of FIGURE 5.
Figure 6A:
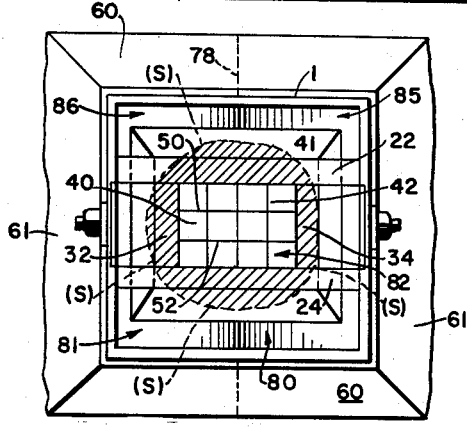
FIGURE 6A is a section view taken on the line 6A—6A of FIGURE 6.

One form of such means is illustrated in FIGURES 5 and 6 where the cutter housing is shown mounted in position for reception of a potato to be cut, and where it is shown in conjunction with certain conduits or flumes that convey the center cut portion straight away from the cutter and which commingle the four slabs but separate the same from the center cut slices.

Referring to FIGURE 5, it is seen that the incoming potato is positioned independently while the lead potato is being finally positioned for direct feed through the cutter. The cutter element 1 is directly affixed, by any suitable means, to two flumes one of which receives the cut slab portions and the other one of which receives the desired, center cut portions of the potato. The outermost of such flumes is represented by the opposed walls 61 (FIGURE 6) and similar interfitting opposed walls 60 (FIGURE 5). The inner of these more or less concentric flumes is seen to consist of opposed walls 70 on the one hand, and opposed walls 64 on the other. Two of the sidewalls of both flumes, as indicated in FIGURE 6, flare outwardly somewhat. The inner flume is directly connected to the cutter means along the lower edges of the slab cutters so that such inner flumes presents a direct discharge conduit for all of the center cuts of the potato. These flow, as indicated in FIGURE 6, through the space generally indicated at 83. On two sides, the slabs cut by knives 32 and 34 lead directly into the exterior flume and into those spaces indicated generally at 85 and 86 (FIGURE 6). It is then necessary to provide means to direct those slabs cut by knives 22 and 24 into the outer flume. To this end, the inner walls 74 and 76 of the outer flume are directed diagonally toward each other as shown in FIGURE 6, forming an apex 78. Such triangular portion is formed with an opening to receive the sidewalls 70 of the inner flume. Such triangular portion is closed at its apex 78 as indicated in FIGURE 5.

By such structure, it will be understood that whereas the slab cut by cutters 32 and 42 and entering spaces 85 and 86 directly flow into the outer flume, the slab portions cut by knives 22 and 24, and propelled through spaces generally indicated at 80 and 81, intercept the apex 78 of the triangular framework just described and necessarily are diverted by the same into the outer flume at this point. Hence, there are two separating flumes, one of which provides for direct discharge of the center cut pieces and the other of which provides for commingling and discharge of the four exterior slab portions. Any further suitable form of means may be utilized to convey the frenched portions of the potato to one area for processing and the slab portions thereof to another area for further processing. Such additional conveying means may be of the type illustrated with respect to the preferred form of structure utilized for separation of slabs from center cuts, to the described hereinafter.

Figure 8:
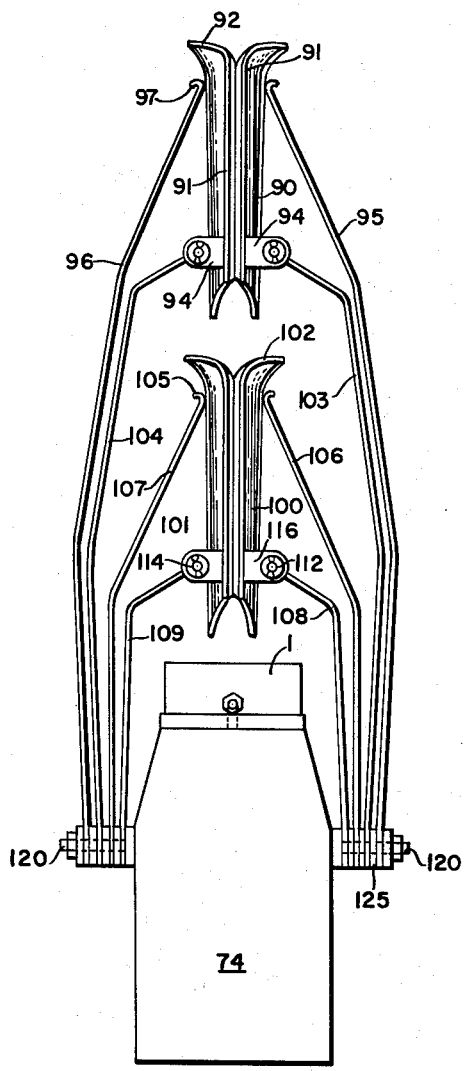
FIGURE 8 is a top plan view of one embodiment of the invention showing the double shoes or guides utilized to accurately position the potato longitudinally with respect to its line of travel prior to impingement upon the cutter device.
Figure 9:
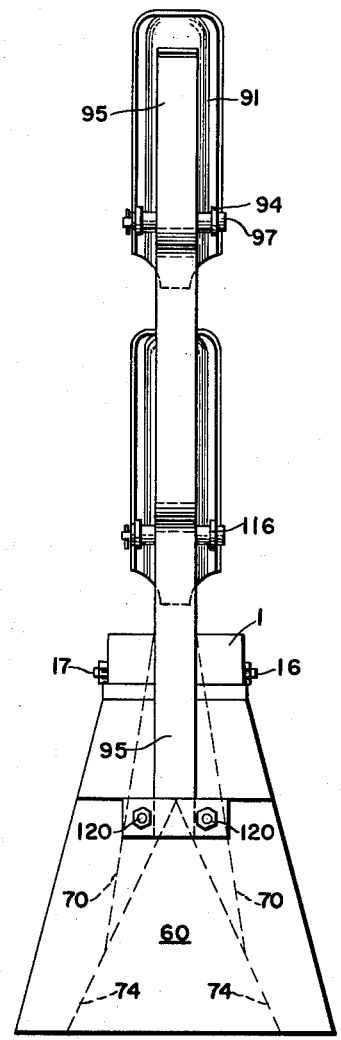
FIGURE 9 is a side elevation view of the invention as it is shown in FIGURE 8.

The centering of the potato for proper positioning thereof prior to admission to the cutter has been mentioned in the foregoing. One pair of guide means or positioners to accomplish this purpose is shown in FIGURES 8 and 9. In the embodiment of the invention herein described these positioners are oval in shape to approximate the shape of the type of potato hereinbefore referred to—the Russet-Burbank potato, which is the most commonly used for French fries. Here a pair of positioning shoes or guides receive the potato and properly align it before the product impinges upon the cutter blades. Although not shown in these figures, it is to be understood that the potato is forced into the first of such positioners directly from the hydraulic line carrying the product toward the slicing apparatus. In the form here shown, two such positioners are utilized. These pairs of guides, as guides 90 and 100, are each formed to approximately the shape of one side of the potato, and together form the oval configuration of same. Two of such shoes or guides 90 first intercept the product; these are located facing each other and each are formed with lateral lips or flanges 91 which extend to or near the upper and lower walls respectively of the casing (to be later referred to) within which the guides and cutter assembly are mounted. Such flanges 91 thus block passage of fluid laterally, the water exterior to the guides additionally then aiding in centering of the same along the axis or flow of the cutting movement. The first of these positioners at its inby end is formed with a flare 92 permitting of easy acceptance of the product during its course toward the cutter device.

The following or second positioning means is similarly made. Here also, two guides or shoes 100, semi-circular in cross-sectional shape, are oppositely positioned, each having opposed flanges 101 for the purpose of water confinement as heretofore explained. Each also is provided with an entering flare or flange 102 so that the product is easily accepted from the first positioning means 91 to the second positioning means 100.

Considering the fact that there will always be some variation in size of the potatoes being processed, these positioning assemblies are so mounted as to flexibly accommodate potatoes of varying dimension. To this end the guide means 90 is resiliently supported at its forward end by opposed spring elements 95 and 96. Each of these terminates in a bent over portion 97 that slidably rests against each one of the guides 90. The elements 95 and 96, of a spring material, are affixed to the outer flume by suitable bolts 120. In addition, the first of the positioners is further resiliently supported at its rear end by additional spring elements 103 and 104 which are connected to the guide plates in pivotal fashion through pivots 97, the latter being secured in suitable lugs 94 that are attached to the outby end of the first positioner as indicated in FIGURE 8. These resilient elements 103 and 104 are likewise connected to the bolt members 120, as illustrated in this figure.

A similar resilient or elastic mounting is provided for the second of the guide means, positioners 100. At the inby end of the latter, two spring elements 106 and 107 rest against the flared portion of the guides; such spring elements are likewise provided with a bent over portion 105 which permits them to slidably press against the exterior of each guide near the flared end 102 thereof. The spring elements 106 and 107 are mounted commonly with the other spring elements previously described through the same bolt means 120. As in the first instance, the second positioner is further supported by a second set of spring members 108 and 109 which similarly, through pivots 112 and 114, mounted in suitable lugs 116, provide a resilient support for the outby end of this second positioning means. Here also members 108 and 109 are affixed to the bolt 120, all of the spring elements preferably being separated from each other by suitable bushings 125.

It can thus be appreciated from the foregoing description that the pairs of shoes or positioners, here two pairs, are so resiliently mounted as to permit expansion to accommodate the largest sized product, with consequent contraction of the over-all size of the guides when smaller sizes of the product are encountered. In any event, these guides or positioners force the potato entering the unit to impinge upon the cutter in straight line fashion only, viz., in longitudinal alignment or endwise relationship with respect to the cutter, and that any jamming action due to crosswise positioning of the potato is completely prevented by the two sets of positioning means just described. It will of course be understood that the entire assembly as shown in FIGURES 5, 6, 8 and 9 is suitably mounted within an appropriate and watertight positioner and cutter casing, the same as or similar to the casing 250 to be hereinafter described.

Reference will now be made to the preferred forms of the following components of the invention: the product feed-in line provided with product in-line separation means, the product positioner-cutter assembly, and the product discharge separation structure.

Referring first to FIGURES 10 and 11, it is seen that the feed-in hydraulic line 150, carrying the stream of potatoes toward the cutter assembly, is connected through a suitable coupling 156 to a conduit of gradually narrowing diameter, conduit 155. If desired, a pressure gauge 158 may be located between the main line 150 and the narrowed conduit 155 in order to determine pressures being obtained (and consequently estimated velocity) at that point in the feed-in line. In any event, the result of the gradual constriction of line 155 is the increase in velocity of the lead potato as it reaches this constricted area represented by conduit 155. Such increase in velocity is consequent upon the increase in pressure in this line due to the gradual decrease in diameter thereof. Since the potato marked "A" (FIGURE 10) has been impulsed forward, due to this constriction, at a greater rate of speed than the following potato, here marked "B" the two become substantially separated so that the lead product "A" enters into the cutter alone and without being crushed by the following potato. Thus the potatoes are adequately separated from each other in clean fashion, progressing through the cutting means one at a time without danger of pile-up at or near the slicing area.

The discharge end of the potato accelerator tube 155 is threaded into a suitable coupling 160 and the latter directly affixed to the cutter casing by means of bolts 161, the arrangement including the usual gasket 184.

An alternate form and in this instance the preferred form of discharge separator is shown in FIGURE 11. Here it is seen that the cutter assembly 1 is positioned within a close fitting receptacle formed within the main casing 250, the latter having a knurled edge or lip 172 which overlaps the cutter mount 1 so as to maintain the same in proper position. The main casing is of unitary construction, except for the cover 251 which by bolts 252 is sealed to this casing in water-tight fashion. The main assembly casing, through the flange 175, and by the usual bolts 177 with intervening gasket 176, is affixed to a complementary flange 178, the latter being made integral with the discharge conduit 180 for the potato slabs (S), these, as before described, being cut from the exterior of the potato and by the unique mechanism herein described also being separated from the interior center cuts thereof. The discharge line for the center cuts is found in line 200 which is constricted somewhat at its forward end and so shaped as at 202 to fit exactly the rectangle or square formed by the slab cutting blades. Therefore, it will be appreciated that all of the center cuts, and as illustrated in FIGURE 11, will be forced through the conduit 200. Conduits 180 and 200 are crossed as also indicated in FIGURE 11, conduit 200 passing through an appropriate opening 205 in the sidewall of the outer conduit, both lines leading to separate points of discharge, as has been explained above. Viewing this figure, it will further be appreciated that slab portions such as the slab (S) cut by the topmost blade of the cutter will be caused, by the force and velocity of the involved water pressure, to slide around the inner conduit 200 and be propelled to point of discharge through conduit 180.

A preferred form of feeder-positioner is illustrated in FIGURES 13 to 17 inclusive. It will here be noted that the forward and rear positioners are held in a manner somewhat different than that previously described. This assembly is mounted within the rectangular cutter assembly casing 250.

As before, two series of positioners are employed, although under certain circumstances it may be found that only one centering or positioning device is adequate to accurately position the incoming stream of potatoes centrally for feed-in to the cutting blades. As contrasted with the positioners shown in FIGURES 8 and 9 it will be observed that the front guide in this embodiment is more elongated than the rear, following positioner. The first guide is pivoted to the cutter casing at the entry at which point it is as large as the incoming pipe line. It then tapers gradually down so that the leaving opening is, as in the assembly first described, just large enough to pass the required flow of water when no potato is in transit through the unit. The arrangement affords gradual entry into the cutter element and thereby precludes damage to the potato.

At any rate, the first positioner takes the form of two like, opposed shoes 255, oval in over-all cross-sectional shape to accommodate the approximate shape of the product being fed therethrough. Each of these shoes is provided with a flared leading edge 260 to facilitate reception of the products. Also, each shoe 255 is provided with flanges 258 of a radial length to abut against the top 251 and bottom 253 (see FIGURE 14) of the positioner-cutter casing 250. These flanges 258, which generally match each other in a position of rest as shown in this figure, substantially preclude water under pressure carrying the charge of product from entering into the area on each side of the members 255 to preclude hydraulic pressure building up against the exterior of the positioning shoes so as to impede opening thereof. In this preferred embodiment of the invention the positioning shoes 255 are flexibly and resiliently located in the desired central position, and maintained in such position despite variations in size of potato, by a spring arrangement somewhat different than that previously described.

At the forward ends of the respective positioners 255 opposed lugs 262 are mounted for the reception of spring means 265. Each of such lugs 262 is formed or recessed with a pocket of a size sufficient to accommodate one end of the respective springs 265. Thus at this forward end of the two elements 255 are spring biased towards each other and centered in the position shown in FIGURES 13 and 16. Each sidewall of the casing 250 is fitted with a tubular member 270 which is threaded into these sidewalls in such fashion as to be directly opposite the aforesaid spring 265. Each tubular member 270 is also provided with internal threading for the reception of one adjustment screw or slug 271. With this construction, it is obvious that the amount of spring pressure on each side of the forward end of the shoe elements 255 can be varied to accommodate various sizes of product. Furthermore these screw elements 271 permit adjustment of the position of the sleeves 255 as to assure centering of same. In addition, the springs 265 can be removed and replaced by means of the couplings 270.

The two positioning elements 255 are supported at their rear or outby ends in somewhat similar fashion. In the same manner, tubular elements 280 are threaded into each sidewall of the casing 250 at a point opposite the rear ends of the respective sleeve elements 255. Each tubular element 280 is provided with a threaded member 282 by which variable pressures may be exerted upon the related springs 281, with consequent adjustment of the pressure exerted by the rear of the elements 255 and with the further consequence of accurately positioning the end of the first pair of sleeves along the center line of the unit.

Base support bars 285 are positioned on each side of the sleeves 255. Each bar 285 is pivoted at its forward end to a lug 287 appropriately mounted in the sidewall of the casing. Each bar 285 terminates at its opposite end in a right angular extension 290, the latter forming support for the inner ends of the respective springs 281, as will be well understood. Each bar 285 is pivoted at its rearward end to pivot 292, such pivot 292 being positioned in suitable apertures formed in opposed lugs 295, the latter being welded upon the sides, and at the rear, of the respective guides 255.

The front positioning means of the unit is thus resiliently and expandably supported in the manner indicated in FIGURES 13 and 16. The pairs of springs, 265 and 281 respectively, additionally provide the necessary pressure to, in part, hold the guides 255 closed against the high velocity water flowing between them, which tries to push them apart.

In this embodiment of the invention the rear guides or positioning shoes are approximately half the length of the forward guides. These rear positioning elements are interlocked by a pinion and pivot arrangement whereby any movement of a guide shoe on one side of the unit is transmitted to the guide shoe on the other side so as to keep the entire positioner balanced and centrally located, thus efficiently directing the potato in lengthwise fashion to the center of the cutter. The two rear guide shoes 300, when disposed as in FIGURE 13, present an oval shape similar to the shape of the first set of guides. At their forward end, they each terminate in outwardly disposed tapers or flares 302. Each of the shoes 300 is also provided with top and bottom vertical flanges 301 that seat together when the guides are adjacent, as indicated in FIGURE 13. Such flanges are for the same purpose as aforesaid: to equalize water pressure upon both sides of the giudes so that the same will not be unduly spread apart during conveyance of the potato due to interior flow of high pressure fluid.

With respect to the referred to interlocking mechanism for the two rear shoes 300 it will be noted that a heavy guide rod 305 is pivoted at one end to pivot 306, and a corresponding guide rod 305' on the opposite side of the positioner pivoted through the case at 306'. Both of these guide rods, at their opposite ends, ride in appropriate flanges 310 and 310' at the end of each guide shoe (see FIGURE 16). The pivots 306 and 306' extend through the sidewall of the casing and upon the opposite side thereof, and, as shown in FIGURE 17, are attached to the respective gear plates 311 and 311'. Hence, any movement of one of the side guide rods 305 or 305' is reflected by corresponding movement of the corresponding gear plates 310 and 310' respectively. The gear plate 311' is, at the same pivot point 306', rigidly attached to a spring support member 320 and the latter fitted with the helical spring means 322. Such spring means is secured at its opposite end to a threaded member 326 which is served through a lug 324 mounted upon the bottom of the feeder-cutter casing 250. The threaded member 326 is provided with a nut 325 which enables control of tension of the referred to spring member 322. Thus any movement of the outby end of the lower shoe 300, as seen in FIGURE 16, will result in corresponding movement of gear plate 311, gear plate 311' and spring plate 320, so that such movement will result in corresponding deflection of the said spring member.

Similarly, the equalizer bar 305' is pivoted through the pivot 306' to the gear plate 311'. Hence, the same type of corresponding movement will result with respect to spring plate 311' upon movement of the posterior portion of the upper shoe (as same is seen in FIGURE 16).

A like spring and gear interlocking arrangement controls proportional and corresponding movement of the front portions of the respective guides 300, i.e., if the upper of one guide (as in FIGURE 16) is moved outwardly, a proportionate and equal amount of movement is imparted to the companion guide 300. This is accomplished through the use of additional rod members 309 and 309', one on each side of the respective guide member 300. Rod 309 is pivoted through the casing at 307, and at its opposite end, 312, merely exerts spring pressure against the outside surface of that guide member. Similarly rod 309' is pivoted at 307', at one end, through the casing; whereas its opposite end, 312', likewise applies spring pressure to the exterior surface of the bottom guide (as seen in FIGURE 16). Both of such pivots 307 and 307' respectively, underneath the casing, are affixed to the gear elements 330 and 332 respectively, such gear elements positioned to engage, as shown. In this instance, the pivot 307 is rigidly affixed to the spring support element 340, and a helical spring 344 attached thereto in any suitable manner. In the same manner as the first gear assembly, such spring is positioned in a threaded element 345 and the latter threaded to an appropriate lug 346 which is affixed to the casing. Such threaded element 345, when provided with a nut 347, permits application of tension to the aforesaid spring means 344. Accordingly, if either one of the guide members 300 is moved outwardly at its forward end, there will be a corresponding movement through the respective rod 309 or 309', through the pivot 307 or 307' and thence to the interlocking gear elements 330 and 332 so that movement on one side results immediately in corresponding movement upon the other side.

Both front and rear portions of the secondary positioners are thus equalized with respect to each other, permitting deflection at front or back ends only in equal amounts, thus assuring full and accurate centering of the potato.

Mention has been made in the foregoing of the tendency of the hydraulic fluid, under the pressure and fluid velocities contemplated, to enter into the area defined by the two guide shoes, thus spreading the same apart to result in possible deflection and misalignment of the potato prior to admission to the cutter. Also, the guide shoes must not only be held together against the high velocity of water, but must also be capable of opening rapidly to guide the potato therethrough. One means for attaining such function is found in the admission of air under pressure behind each of the positioning shoes, a predetermined pressure of air thus counterbalancing this "spreading-apart" tendency of water pressure. As seen in FIGURE 16 air under pressure may be admitted, in this example, merely behind the second positioning means, to a point midway between the respective lengths of the two opposed shoes 300, this being done by air inlet pipes 360 and 361 threaded directly into cutter assembly casing 250. Suitable valves (not shown) can be inserted in the respective lines 360 and 361 to not only control pressure and velocity of air so admitted, but to evenly balance such variables on both sides of the positioning shoes.

An alternative means for accomplishing this same function, but utilizing the same principle, may take the form of air bladders positioned behind each guide means. By this is meant air under pressure confined within a rubber container so fabricated as to fit behind each shoe and provided with a valve means to permit inflation to the pressure which will accomplish this function. In such case these bladders will prevent flow of hydraulic fluid on each side of the positioning shoes and confine the same largely to flow between the shoes, but at the same time, depending upon the pressure within such bladders, will permit necessary separation of the shoes in an outward direction for ready acceptance and centering of the potato as it passes through to the cutter.

It is desired of course that the main force of the feed water under pressure be directed towards impelling the potato towards the cutter, without being dissipated to one side and without deviating from the desired straight line of travel toward the cutter. Accordingly, plates 375, complementary in shape to the cutter box 1, are positioned immediately in front of the cutter, the outer edges of such circumferential plates seating in complementary grooves or recesses 380 formed in the cutter box casing. The other edges of such sealing plates are arranged to slidably engage ridges 385 on the extensions 310, 310' at the rear ends of each positioner 300. The recesses 380 in the casing permit the plates 375, which abut against the cutter casing, to move inwardly or outwardly and still maintain a sealed relationship with respect thereto. In this manner fluid is prevented from escaping through those areas where the slabs (S) are removed from the potato, and the force of hydraulic pressure concentrated behind the potato and in exact alignment with the edges of the outer knives of the cutter device.

It is of course obvious that various different arrangements, to suit different conditions and products, can be utilized in the construction of the cutter. All such arrangements can be fabricated to fit within the cutter casing 1 so that all that need be done to substitute blades is removal of the set in use and insertion in the casing of an alternate type of blade arrangement.

One such alternate type of cutting mechanism is illustrated in FIGURE 18. This cutter device is designed for so-called "string" potatoes or adapted for the cutting of strips of the product into thinner or narrower, elongated slices. In the embodiment of the cutter shown in FIGURE 18, it is seen that there are nine separate blades, crossing each other, the outermost of such blades being of the greatest height and the succeeding of each of such blades being of gradually decreasing height as illustrated in this figure. It is obvious that other combinations following this same principle of blade staggering may be devised to attain the type and grade of cut desired.

At any rate, and referring to FIGURE 18, it is seen that a series of blades 400 intersects at right angles a like series of blades 402, in the manner just described, there being a total of eighteen blades. Such blades are not unitary with the several supports, 410 and 415 respectively, upon which they are mounted, but rather removable therefrom. In a cutter setup of the relative complexity of that shown in FIGURE 18, knock down and assembly of the blade arrangement would be far more difficult than with the cutter device as shown in FIGURE 2. To simplify this, each blade of the cutter device, as shown in FIGURE 19, is fabricated with a groove 412 oppositely disposed with respect to the blade edge. This groove is adapted to be seated in a corresponding supporting plate such as the blade support 415. This requires that each support for an intersecting blade such as each of the supports 410 or 415 must, in addition to the slot provided for the crossing blade, also be provided with a slot or opening of the same dimension as the cross section of a given blade, as 400. This permits of the series of blade supporting plates 410 and 415 to be permanently welded together and, for sharpening purposes, the several blades to be readily removable. Each of the blades resting upon such welded supports can be so made, and the opening in the crossing support so formed, as to attain a press fit which will maintain it rigidly in position during the cutting operation.

Furthermore, if such crossed supports be securely welded together rapidity is lent to the entire blade structure.

From the foregoing description it will be appreciated that we have devised a method, particularly with respect to the potato industry, for continuously, rapidly and efficiently slicing the potato in such manner that no waste whatever is involved. Perhaps more significantly, the aim has been achieved for the first time of cutting frenched potatoes solely from the inner cross-sectional area of the product, such cut representing the over-all length of the potato. The ultimate product eliminates guesswork: the final marketable ietm as sold in package form contains only maximum lengths of frenched potatoes, without inferior proportions thereof, without slivers, and without undesirable skin portions.

The concept of hydraulic feed, coupled with the novel knife arrangement herein disclosed, cooperates to achieve a proper cut with great speed and without any damage (a most important factor) to the cellular structure of the product. Furthermore, it is an inherent advantage of the invention herein described that the entire cutting and separating operation is conducted with the product always under water—a factor, particularly with respect to potatoes, which precludes deterioration or coloring thereof due to contact with air.

These objectives are obtained by structure of comparative simplicity. Since the entire potato, when so processed, is utilized including the more undesirable slab portions, the process represents one of unusual economy. Also, because provision has been made for recycling of the water used, this further results in a comparatively low-cost operation, particularly in certain potato growing areas where by its lack of abundance, fresh water, having regard for the quantities which would ordinarily be used, is a relatively expensive commodity.

From the above detailed description of the invention, the operation and construction of same should be apparent. While there are herein shown and described preferred embodiments of the invention, it is nevertheless understood that various changes may be made with respect thereto without departing from the principle and scope of the invention as measured by the claims appended hereto.

We claim:

1. A method for the cutting of a vegetable food product into predetermined sizes comprising feeding a plurality of said products into a zone containing a fluid medium, discharging said medium under pressure together with said products to a zone of gradually decreasing diameter to separate said products one from the other and to accelerate the movement of said products to effective cutting speed, individually and sequentially feeding said separated products into a cutting zone and cutting said products into center and outside cuts in said cutting zone, separating said center cuts from said outside cuts and separately discharging the center and outside cuts, recovering said medium from said separated cuts and recycling said medium to said fluid medium containing zone.

2. A method for the cutting of vegetable food products into predetermined sizes comprising feeding said products into a zone containing a fluid medium, discharging said medium under pressure while carrying said products to a zone of gradually decreasing diameter to separate said products one from the other and to accelerate the movement of said products to effective cutting speed, sequentially feeding individual of said separated products into a positioning and aligning zone prior to cutting thereof, dischargng the aligned products into a cutting zone and cutting said products into center and outside cuts in said cutting zone, separating said center and outside cuts, recovering said medium from said separated cuts and recycling said medium to said fluid medium containing zone.

3. A method for the cutting of a vegetable food product into predetermined sizes comprising introducing said product into a moving liquid medium, discharging said medium and said product under pressure to an aligning and positioning zone whereby said product is centered with its longitudinal axis coincident with the line of travel by said medium, feeding said product from said positioning zone into a cutting zone and dividing said product into center and outside cuts in said cutting zone, separating said center and outside cuts, and separately discharging said center and said outside cuts, each of said foregoing steps being continuously conducted while said product is submerged in said liquid.

4. In a method for the cutting of a vegetable food product, the sequential and continuous steps of feeding a plurality of said products into a zone containing a fluid medium, propelling said medium under pressure together with said products at a cutting speed to a zone of gradually decreasing diameter to longitudinally space the adjacent of said products from each other and to accelerate the movement of said products to effective cutting speed, feeding said spaced products into a product positioning zone to position each of the spaced products centrally and longitudinally of the line of travel of said medium for aligned cutting feed, feeding said aligned products to a cutting zone and cutting said products into a plurality of center and outside cuts in said cutting zone, separating said center cuts from said outside cuts and separately discharging the same, recovering said medium from said separated cuts and recycling said medium to said fluid medium containing zone.

References Cited in the file of this patent

UNITED STATES PATENTS

| | | |
|---|---|---|
| 1,908,220 | Chapman | May 9, 1933 |
| 2,620,841 | Jacobson | Dec. 9, 1952 |
| 2,667,197 | Giles | Jan. 26, 1954 |
| 2,956,838 | Thoresen | Oct. 18, 1960 |

FOREIGN PATENTS

| | | |
|---|---|---|
| 842,420 | Germany | June 26, 1952 |